US006855017B2

(12) United States Patent
Roycroft

(10) Patent No.: US 6,855,017 B2
(45) Date of Patent: Feb. 15, 2005

(54) POWER TRAIN

(75) Inventor: Terence James Roycroft, Waiuku (NZ)

(73) Assignee: Gibbs Technologies Limited (GB)

( * ) Notice: Subject to any disclaimer, the term of this patent is extended or adjusted under 35 U.S.C. 154(b) by 0 days.

(21) Appl. No.: 10/363,011

(22) PCT Filed: Aug. 30, 2001

(86) PCT No.: PCT/GB01/03867
§ 371 (c)(1),
(2), (4) Date: Jun. 24, 2003

(87) PCT Pub. No.: WO02/18166
PCT Pub. Date: Mar. 7, 2002

(65) Prior Publication Data
US 2004/0009717 A1 Jan. 15, 2004

(51) Int. Cl.[7] .................................................. B60F 3/00
(52) U.S. Cl. ......................... 440/12.57; 440/75; 440/83
(58) Field of Search .............................. 440/12.5, 12.51, 440/12.57, 12.59, 12.6, 75, 83

(56) References Cited
U.S. PATENT DOCUMENTS 4,632,207 A * 12/1986 Moore ........................ 180/247
4,958,584 A    9/1990 Williamson
5,690,046 A * 11/1997 Grzech, Jr. .................. 440/12.5
5,727,494 A *  3/1998 Caserta et al. ............ 114/55.51
5,752,862 A *  5/1998 Mohler et al. ................. 440/38

FOREIGN PATENT DOCUMENTS

FR    2309364    11/1976
FR    2411095     7/1979

OTHER PUBLICATIONS

Copy of International Search Report dated Dec. 7, 2001.
Copy of United Kingdom Search Report dated Jul. 23, 2001.

* cited by examiner

Primary Examiner—Stephen Avila
(74) Attorney, Agent, or Firm—Young & Basile, P.C.

(57) ABSTRACT

Power train for an amphibious vehicle has an engine aligned with vehicle axis. The crankshaft drives optional flexible coupling, shaft, and optional decoupler. Drive shaft drives marine propulsion means, which may be a water jet drive or a screw propeller. Shaft also drives bevel gear, which drives transmission through bevel gear and input shaft. Hence, transmission is mounted transversely, and perpendicular to the engine. The bevel gears, coupling and decoupler are contained in a casing. Transmission drives road wheels through integral differential, drive shafts, and relay shaft. Transmission may be manual, sequential change manual, automated manual, automatic, or continuously variable transmission. The engine may be offset to the vehicle center line.

10 Claims, 3 Drawing Sheets

POWER TRAIN

BACKGROUND OF THE INVENTION

The present invention relates to a power train which is particularly suitable for use in an amphibious vehicle capable of travel on land and water, and more particularly to a means of adapting a conventional transverse automotive power train having an engine, transmission and differential, to drive the wheels and the marine propulsion of an amphibious vehicle.

In a conventional front wheel drive automotive arrangement, an engine and transmission are positioned transversely to the vehicle axis at the front of the vehicle. The transmission incorporates an integral differential, located at the rear of the transmission, which drives the front wheels of the vehicle via a pair of axle shafts.

This transverse front wheel drive engine and transmission arrangement is almost universal in small passenger vehicles and is therefore produced in high volumes, which makes the arrangement most procurable for use in amphibious vehicles. In choosing a power train for a specialised low volume production vehicle, such as an amphibious vehicle, availability is an important factor. A high power-to-weight ratio and compactness are further advantages of the transverse arrangement, in comparison with the traditional longitudinal power train arrangement currently used in large commercial vehicles.

Previously it has not been thought possible to adapt a transverse power train as used in a front wheel drive vehicle for use in an amphibious vehicle because of the difficulty of arranging a power take off to drive a marine propulsion means. Transverse orientations restrict space at either end of the engine and transmission assembly making power take off arrangements at the timing end of the crankshaft, or between the engine and transmission, very difficult. Furthermore, it has not been found possible to take power from the transmission output of an integrated transmission and differential unit.

SUMMARY OF THE INVENTION

It is an object of the present invention to provide a power train for an amphibious vehicle, in which a conventional transverse automotive power train is adapted and utilised and in which the above disadvantages are reduced or substantially obviated.

According to a first aspect of the present invention, there is provided a power train for an amphibious vehicle, the power train comprising an engine, transmission and differential, characterised in that, the power train is adapted such that the engine can be mounted with the crankshaft of the engine substantially in axial alignment with, or parallel to, the longitudinal axis of the vehicle, the transmission being arranged such that an input shaft of the transmission is substantially perpendicular to the axis of the crankshaft, the power train further comprising a drive shaft substantially in axial alignment with, and driven by, the crankshaft, the drive shaft being adapted to provide drive to a marine propulsion means of the vehicle, and also to the transmission.

Preferably, the drive shaft provides drive to the transmission through a pair of meshing bevel gears. In this arrangement, one of the bevel gears may be mounted on the drive shaft, and the other bevel gear may be mounted on the input drive shaft of the transmission.

Preferably, the drive shaft is connected to the crankshaft through a flexible coupling.

Preferably, the drive shaft is connected with a drive shaft of the marine propulsion means through a decoupler.

In a preferred embodiment, the drive shaft and the bevel gears are housed in a casing.

The transmission may comprise a manual, sequential change manual or automated manual gear box, in which case a friction clutch may be provided to allow selective engagement of drive between the input shaft of the transmission and an input shaft of the gearbox.

Alternatively, the transmission may comprise an automatic gearbox, in which case a fluid coupling may be provided to couple the input shaft of the transmission to an input shaft of the gearbox.

In a further alternative embodiment the transmission is a continuously variable transmission.

According to a second aspect of the invention, there is provided an amphibious vehicle comprising a power train accordance with the first aspect.

BRIEF DESCRIPTION OF THE INVENTION

The invention will now be described, by way of example only, with reference to the accompanying drawings, in which.

DETAILED DESCRIPTION OF THE PREFERRED EMBODIMENT

Figure 1:
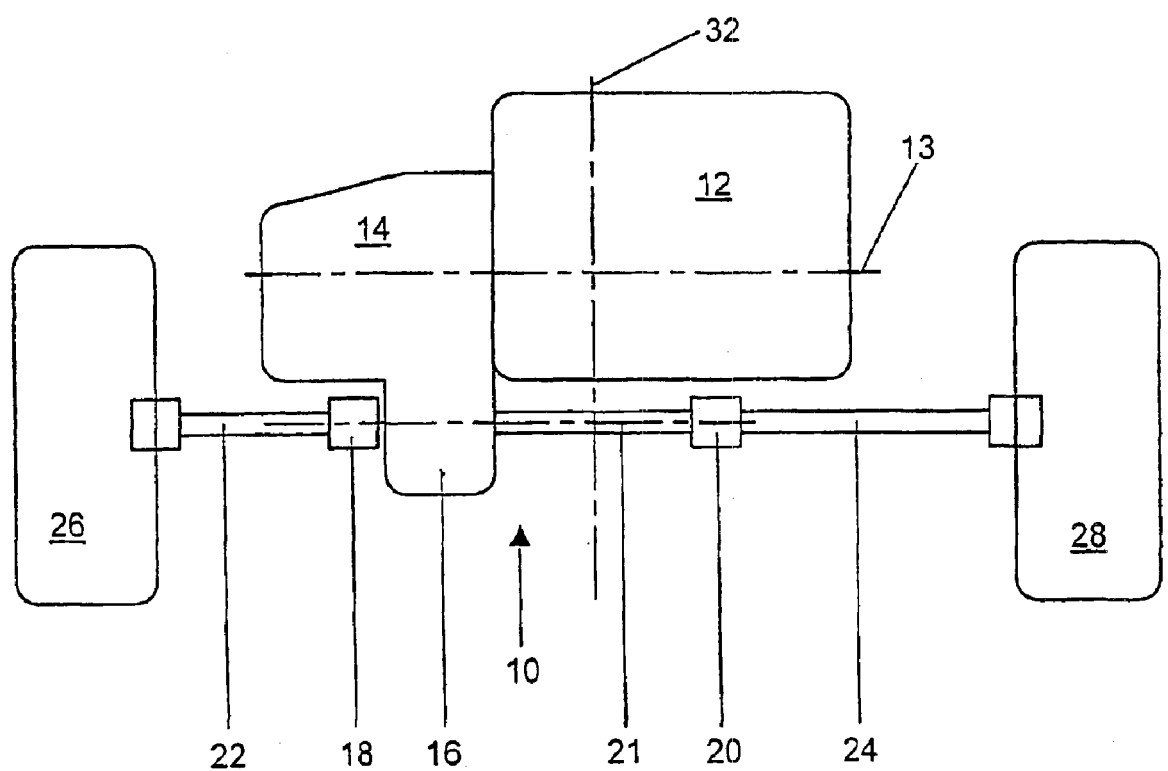
FIG. 1 shows a plan view of conventional transverse front wheel drive power train arrangement.

Referring firstly to FIG. 1, a conventional transverse front wheel drive power train is indicated generally at 10. An engine 12 and transmission 14 are positioned at the front of a vehicle (not shown), with the axis 13 of the crankshaft of the engine and the transmission transverse to the longitudinal axis 32 of the vehicle. The transmission 14 has an integral differential 16, which is positioned at the rear of the transmission 14. The differential drives the front wheels 26, 28 of the vehicle through axle shafts 22, 24. The axle shaft 22 which drives the left hand (as viewed) front wheel 26 is connected to the differential by a constant velocity joint 18. The axle shaft 24 which drives the right hand (as viewed) front wheel 28 is connected to the differential through a further constant velocity joint 20 and a relay shaft 21.

Figure 2:
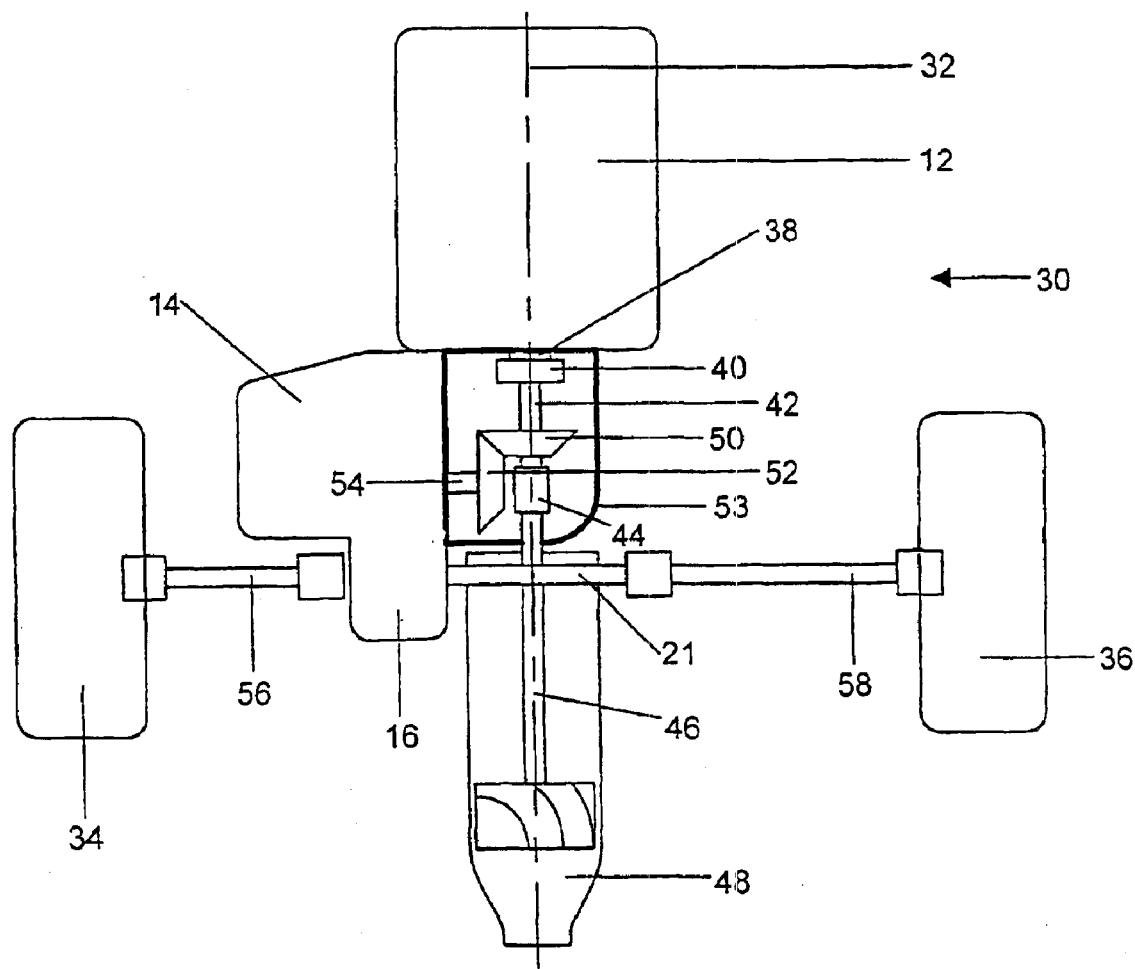
FIG. 2 shows a plan view of a power train in accordance with the invention.

Referring now to FIG. 2, a power train layout for an amphibious vehicle in accordance with the invention is generally indicated at 30. Common reference numerals have been used to designate parts in common with parts shown in FIG. 1.

An engine 12 is positioned with the crankshaft (not shown) of the engine 12 longitudinally aligned with the vehicle axis 32. The engine 12 is mounted in the vehicle forward of the centre line of the rear wheels 34, 36 and the conventional output drive end 38 of the crankshaft is connected to a flexible coupling 40. A drive shaft 42 is in axial alignment with the crankshaft of the engine and is driven by the crankshaft through the flexible coupling 40. A decoupler 44 is mounted to the drive shaft 42 at its end remote from the flexible coupling 40, the decoupler 44 being arranged to couple/decouple drive to a drive shaft 46 of a marine propulsion means in the form of a water jet unit 48.

Whilst the use of a decoupler to decouple drive to the marine propulsion means 48 when the vehicle is being used on land is preferred, this is not essential and the decoupler 44 can be omitted if desired. Where the decoupler 44 is omitted, the drive shaft 46 will be connected directly to drive shaft 42 or the shaft 42 could be an extension of the shaft 46.

A transmission 14 is mounted behind the engine 12, with an input drive shaft 54 of the transmission extending perpendicularly to the axis of the crankshaft of the engine. A first bevel gear 50 is mounted on the drive shaft 42, between the flexible coupling 40 and the decoupler 44, and a second bevel gear 52 mounted on the input drive shaft 54 meshes with the first bevel gear 50. Drive from the engine 12 is therefore directed through 90° by the bevel gears 50, 52 into the transmission 14. The drive shaft 42, the bevel gears 50, 52, the decoupler 44 and the flexible coupling 40 are all housed together in a casing 53.

The transmission 14 may be a manual, sequential manual or automated manual gearbox in which case a friction clutch (not shown) may be provided to allow selective engagement of drive between the input shaft 54 to the transmission and an input shaft (not shown) of the gearbox itself. Alternatively, the transmission may be an automatic or semi-automatic gearbox in which case the friction clutch can be replaced by a fluid coupling such as a hydraulic torque converter as appropriate. In a further alternative, the transmission may be a continuously variable transmission.

A differential 16, integral with the transmission 14, provides drive to the rear wheels 34, 36 of the vehicle through axle shafts 56, 58. The axle shaft 56 is driven directly from the left hand side (as viewed) of the differential 16. The axle shaft 58 is driven from the right hand side (as viewed) of the differential 16 through a relay shaft 21. The axle shafts may comprise constant velocity or other universal joints in a manner well known in the art.

The position of the engine 12 and the transmission 14 is ideally suited for an amphibious vehicle, because the weight of these components is towards the rear of the vehicle, which is a requirement for optimum marine performance. Furthermore, because the water jet unit 48 is driven directly from the crankshaft of the engine, rather than from a power take off at the output of the transmission for example, the maximum power of the engine 12 can be transmitted to the water jet unit 48 with the minimum of frictional losses. In this respect it should be noted that in an amphibious vehicle, it is more important for the marine propulsion unit to receive full engine power than it is for the wheels to receive fill engine power.

Figure 3:
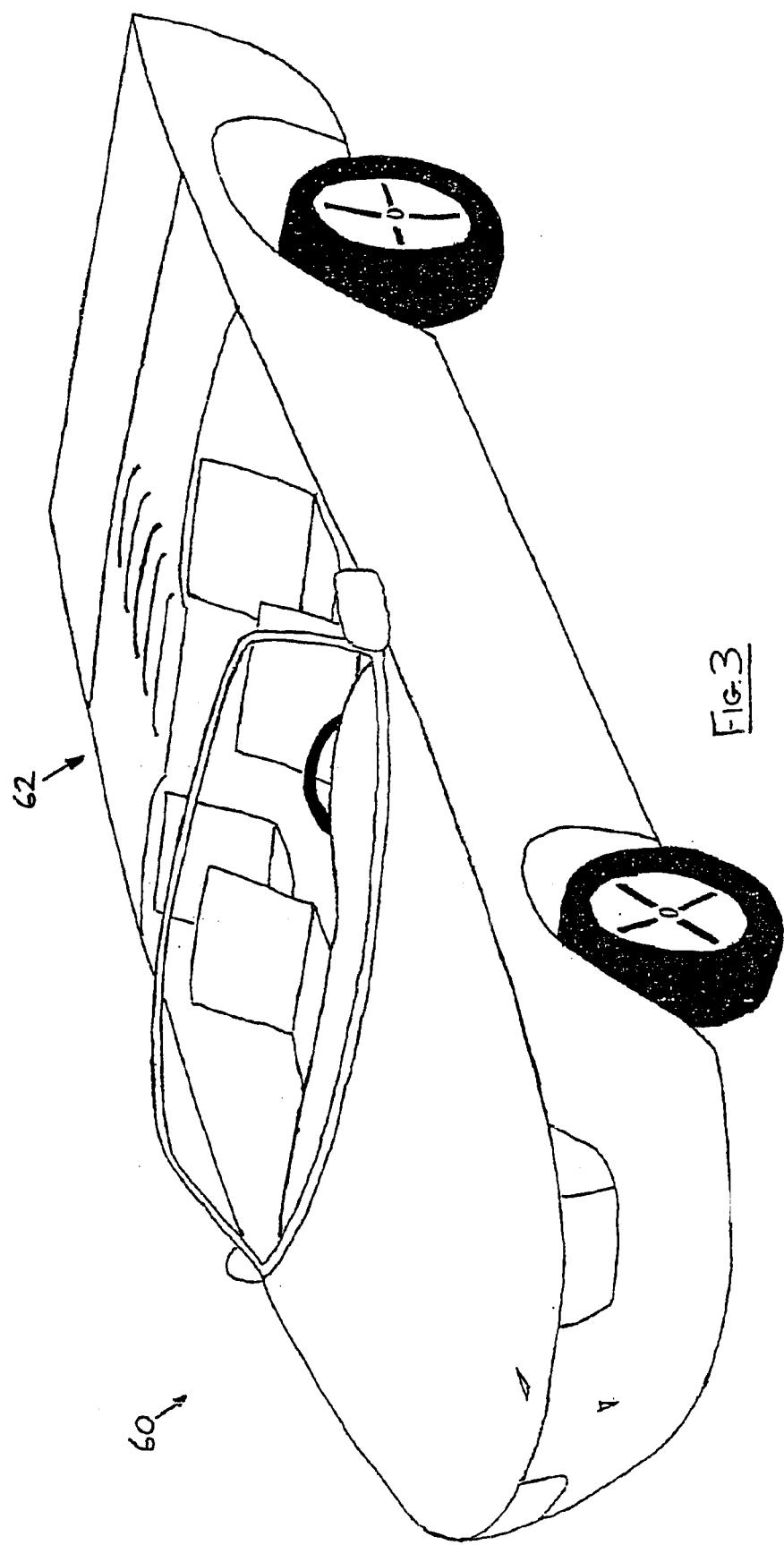
FIG. 3 shows an amphibious vehicle in accordance with a second aspect of the invention.

FIG. 3 shows an amphibious vehicle 60 having an engine compartment 62 in which a power train in accordance with FIG. 2 is located.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention. For example, whereas it is preferred that the axis of the crankshaft should be in axial alignment with the longitudinal axis of the vehicle, if required, the power train could be mounted so that the axis of the crankshaft is parallel to but offset to one side from the longitudinal axis of the vehicle. Furthermore, the water jet unit 48 may be replaced by any suitable marine propulsion means, for example, a marine screw propeller.

What is claimed is:

1. A power train for an amphibious vehicle, the power train comprising an engine, transmission and differential, characterized in that, the power train is adapted such that the engine can be mounted with the crankshaft of the engine substantially in axial alignment with, or parallel to, the longitudinal axis of the vehicle, the transmission being arranged such that an input shaft of the transmission is substantially perpendicular to the axis of the crankshaft, the power train further comprising a drive shaft substantially in axial alignment with, and driven by, the crankshaft, the drive shaft being adapted to provide drive to a marine propulsion means of the vehicle, and also to the transmission.

2. A power train as claimed in claim 1, wherein the drive shaft provides drive to the transmission through a pair of meshing bevel gears.

3. A power train as claimed in claim 2, wherein one of the bevel gears is mounted on the drive shaft, and the other bevel gear is mounted on the input drive shaft of the transmission.

4. A power train as claimed in claim 1, wherein the drive shaft is connected to the crankshaft through a flexible coupling.

5. A power train for an amphibious vehicle, the power train comprising an engine, transmission and differential, characterized in that, the power train is adapted such that the engine can be mounted with the crankshaft of the engine substantially in axial alignment with, or parallel to, the longitudinal axis of the vehicle, the transmission being arranged such that an input shaft of the transmission is substantially perpendicular to the axis of the crankshaft, the power train further comprising a drive shaft substantially in axial alignment with, and driven by, the crankshaft, the drive shaft being adapted to provide drive to a marine propulsion means of the vehicle, and also to the transmission wherein the drive shaft is connected with a drive shaft of the marine propulsion means through a decoupler.

6. A power train as claimed in claim 2, wherein the drive shaft and the bevel gears are housed in a casing.

7. A power train for an amphibious vehicle, the power train comprising an engine, transmission and differential, characterised in that, the power train is adapted such that the engine can be mounted with the crankshaft of the engine substantially in axial alignment with, or parallel to, the longitudinal axis of the vehicle, the transmission being arranged such that an input shaft of the transmission is substantially perpendicular to the axis of the crankshaft, the power train further comprising a drive shaft substantially in axial alignment with, and driven by, the crankshaft, the drive shaft being adapted to provide drive to a marine propulsion means of the vehicle, and also to the transmission wherein the transmission comprises one of a manual, sequential manual and automated manual gear box, and a friction clutch is provided to allow selective engagement of drive between the input shaft of the transmission and an input shaft of the gearbox.

8. A power train for an amphibious vehicle, the power train comprising an engine, transmission and differential, characterised in that, the power train is adapted such that the engine can be mounted with the crankshaft of the engine substantially in axial alignment with, or parallel to, the longitudinal axis of the vehicle, the transmission being arranged such that an input shaft of the transmission is substantially perpendicular to the axis of the crankshaft, the power train further comprising a drive shaft substantially in axial alignment with, and driven by, the crankshaft, the drive shaft being adapted to provide drive to a marine propulsion means of the vehicle, and also to the transmission wherein the transmission comprises an automatic gearbox and a fluid coupling is provided to couple the input shaft of the transmission to an input shaft of the gearbox.

9. A power train as claimed in claim 1 wherein the transmission comprises a continuously variable transmission.

10. An amphibious vehicle, comprising the power train as claimed in claim 1.

* * * * *